No. 712,529. Patented Nov. 4, 1902.
S. HENRY.
MILKING APPARATUS.
(Application filed Feb. 26, 1902.)
(No Model.)
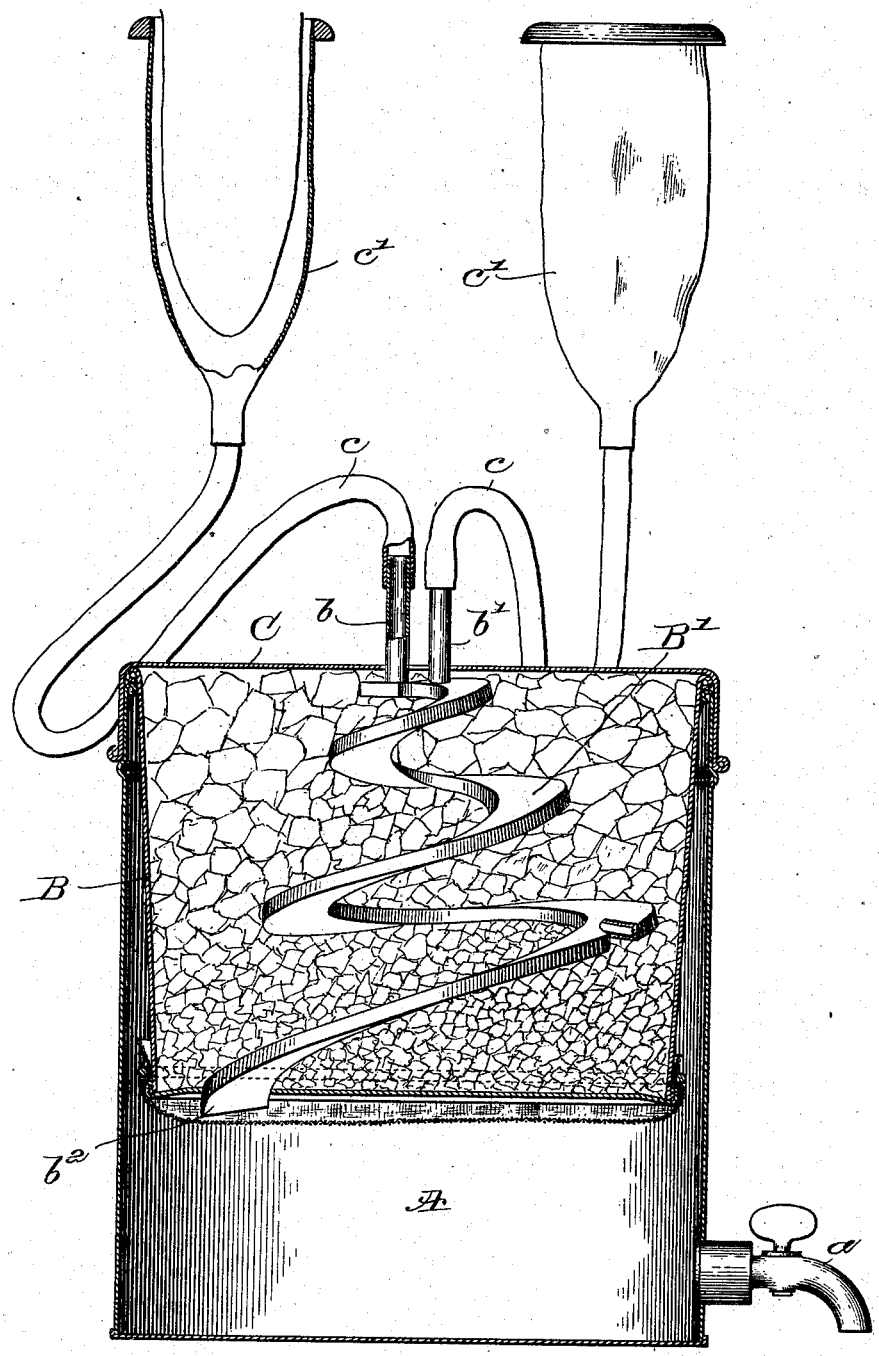

UNITED STATES PATENT OFFICE.

STEPHEN HENRY, OF MARSHFIELD, MASSACHUSETTS.

MILKING APPARATUS.

SPECIFICATION forming part of Letters Patent No. 712,529, dated November 4, 1902.

Application filed February 26, 1902. Serial No. 95,779. (No model.)

*To all whom it may concern:*

Be it known that I, STEPHEN HENRY, a citizen of the United States, and a resident of Marshfield, county of Plymouth, State of Massachusetts, have invented an Improvement in Milking Apparatus, of which the following description, in connection with the accompanying drawing, is a specification, like letters on the drawing representing like parts.

This invention has for its object the production of a novel apparatus for use by those who are called upon to milk cows, the aim of the invention to be herein described being the production of an apparatus in which the milk may be deposited in a vessel without being at all exposed while passing from the udder into the vessel, and thereby all possibility of contaminating the milk is avoided and the milk is in a fully sanitary condition. Milk when warm and standing in a pail or while passing through the air from the udder into the pail is liable to collect microbes or bacteria. In dairies it is customary and desirable to cool the milk as quickly as possible, and I have provided my apparatus with a cooling-chamber that may contain ice or any other cooling mixture, and the milk is led by a suitable conduit through the cooling-chamber and the cooled milk is strained on its way into the vessel referred to. I have provided suitable flexible covers or shields that may be applied to the dugs, and said shields have connected with them suitable flexible tubes, that lead the milk into the conduit referred to.

The drawing in section and elevation shows my apparatus as it will appear in use.

The apparatus shown consists, essentially, of a vessel A, that receives the milk and from which the milk may be taken through a suitable outlet $a$ and introduced into cans or other receptacles. The vessel A contains a cooling-chamber B, in which is arranged a conduit B', shown as a spiral tube having suitable inlet-pipes $b\ b'$, said conduit having an outlet at $b^2$ in the bottom of the cooling-chamber. The shape of this conduit is immaterial so long as it may be packed in ice or other cooling medium placed in the chamber B. The inlets $b\ b'$, of any desired number, are shown as extended through a hole in a cover C, that closes the upper end of the chamber, and said inlets receive upon them flexible tubes $c\ c$, that are connected with flexible covers or shields $c'\ c'$, preferably of pure gum-rubber, that they may be soft and flexible and be readily fitted over the dugs they stretch more or less to properly inclose the dugs. Before milking the udder and dugs will be properly washed and the shields will be placed over the dugs and the pipe connected with the conduit, and in this way it will be seen that all liability of contaminating the milk being taken from the dugs and deposited in the vessel A will be avoided, and also the milk will be more or less cool and the milk leaving the conduit will be strained before it enters the vessel A.

Having described my invention, what I claim as new, and desire to secure by Letters Patent, is—

1. A milking apparatus comprising a vessel into the lower part of which the milk is to be directed, a cooling-chamber also supported within said vessel and containing a conduit, a cover for said vessel and cooling-chamber, and flexible tubes connected to the conduit in the cooling-chamber and provided at their ends with dug-covering shields.

2. A milking apparatus comprising a vessel, a cooling-chamber, a conduit therein, a cover for said cooling-chamber, flexible tubes connected with said conduit, a dug-covering shield at one end of said tube, and a strainer located between said cooling-chamber and vessel.

3. A milking apparatus, comprising a vessel to receive and contain the milk, a cooling-chamber movably supported within said vessel, a spiral conduit in said chamber, a cover fitted to said vessel and chamber and provided with an inlet, and a flexible tube connected therewith and provided with a dug-covering shield of flexible material.

In testimony whereof I have signed my name to this specification in the presence of two subscribing witnesses.

STEPHEN HENRY.

Witnesses:
GEO. W. GREGORY,
EDWARD F. ALLEN.